(12) United States Patent
Zheng et al.

(10) Patent No.: US 11,366,698 B2
(45) Date of Patent: Jun. 21, 2022

(54) EFFICIENT USE OF COMPUTING RESOURCES IN RESPONDING TO CONTENT REQUESTS

(71) Applicant: Google LLC, Mountain View, CA (US)

(72) Inventors: Jiefu Zheng, Saratoga, CA (US); Hossein Karkeh Abadi, Belmont, CA (US)

(73) Assignee: Google LLC, Mountain View, CA (US)

( * ) Notice: Subject to any disclaimer, the term of this patent is extended or adjusted under 35 U.S.C. 154(b) by 437 days.

(21) Appl. No.: 16/673,526

(22) Filed: Nov. 4, 2019

(65) Prior Publication Data
US 2020/0341816 A1    Oct. 29, 2020

Related U.S. Application Data

(63) Continuation of application No. PCT/US2019/029292, filed on Apr. 26, 2019.

(51) Int. Cl.
G06F 9/46      (2006.01)
G06F 9/50      (2006.01)
G06N 20/00    (2019.01)

(52) U.S. Cl.
CPC ........... *G06F 9/5038* (2013.01); *G06N 20/00* (2019.01)

(58) Field of Classification Search
CPC .................................................. G06F 9/5038
See application file for complete search history.

(56) References Cited

U.S. PATENT DOCUMENTS

| | | | |
|---|---|---|---|
| 6,058,426 A | 5/2000 | Godwin et al. | |
| 8,135,619 B2 | 3/2012 | Bem | |
| 8,429,012 B2 | 4/2013 | Wright et al. | |
| 9,098,333 B1 | 8/2015 | Obrecht et al. | |
| 2006/0218285 A1 | 9/2006 | Talwar et al. | |
| 2015/0170072 A1 | 6/2015 | Grant et al. | |
| 2015/0269156 A1 | 9/2015 | Awadallah et al. | |
| 2018/0278719 A1 | 9/2018 | Dawson et al. | |

FOREIGN PATENT DOCUMENTS

| | | |
|---|---|---|
| KR | 10-2006-0012301 | 2/2006 |
| KR | 10-2013-0082685 | 7/2013 |

(Continued)

OTHER PUBLICATIONS

KR Office Action in Korean Appln. No. 10-2020-7007383, dated Jun. 4, 2021, 11 pages (with English translation).

(Continued)

*Primary Examiner* — Gregory A Kessler
(74) *Attorney, Agent, or Firm* — Fish & Richardson P.C.

(57) ABSTRACT

Methods, systems, and apparatus, including computer programs encoded on a computer storage medium, for efficiently using computing resources when responding to content requests. Methods include using a prioritization model and a specified threshold specifying the maximum allowable negative outcome for a content provider, to determine whether a received content request is a low priority request. Methods further include throttling access to computing resources to respond to low priority requests, while providing access to computing resources for other content requests. Methods also include regularly updating the prioritization model and the specified threshold based on data for a new set of content requests.

24 Claims, 5 Drawing Sheets

(56) References Cited

FOREIGN PATENT DOCUMENTS

KR   10-2015-0083713   7/2015
KR      20150074047   7/2015

OTHER PUBLICATIONS

Office Action in Japanese Appln. No. 2020-515102, dated Dec. 20, 2021, 12 pages (with English translation of allowed claims).
International Preliminary Report on Patentability in International Appln. No. PCT/US2019/029292, dated Sep. 28, 2021, 8 pages.
Office Action in Japanese Appln. No. 2020-515102, dated Aug. 16, 2021, 6 pages (with English translation).
PCT International Search Report and Written Opinion, issued in International Application No. PCT/US2019/029292, dated Oct. 22, 2019, 14 pages.
Office Action in Japanese Appln. No. 2020-515102, dated Dec. 20, 2021, 16 pages (with English translation of allowed claims).
Office Action in Korean Appln. No. 10-2020-7007383, dated Dec. 3, 2021, 3 pages (with English translation).

EFFICIENT USE OF COMPUTING RESOURCES IN RESPONDING TO CONTENT REQUESTS

CROSS-REFERENCE TO RELATED APPLICATIONS

This application is a continuation application of, and claims priority to, PCT Patent Application No. PCT/US2019/029292, titled "EFFICIENT USE OF COMPUTING RESOURCES IN RESPONDING TO CONTENT REQUESTS," filed on Apr. 26, 2019. The disclosure of the foregoing application is incorporated herein by reference in its entirety for all purposes.

BACKGROUND

This specification relates to data processing and efficient use of computing resources in responding to content requests.

Content providers regularly receive numerous content requests and provide content in response to these requests. Processing and responding to these requests may require a significant amount of computing resources.

SUMMARY

In general, one innovative aspect of the subject matter described in this specification can be embodied in methods including the operations of receiving, by a data processing apparatus and from a client device, a content request; extracting, by the data processing apparatus, features from the content request; inputting, by the data processing apparatus, the features to a prioritization model that is trained using a set of prior requests for content; obtaining, by the data processing apparatus and from the prioritization model, a priority value for the content request based on the features input to the model; determining a specified threshold based on a target loss percentage and outcomes for the set of prior content requests; and throttling, by the data processing apparatus, access to computing resources used to respond to the request based on the specified threshold and the priority value for the request, including: providing access to the computing resources to respond to the request when the prioritization model outputs a priority value that meets the specified threshold; and denying access to the computing resources when the prioritization model outputs a priority value that fails to meet the specified threshold. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Methods can include identifying, as holdout requests, a set of subsequent requests for content received following receipt of the content request; providing access to the computing resources required to respond to the holdout requests irrespective of any priority value for the holdout requests; monitoring actual outcomes for content provided in response to the holdout requests; and updating the prioritization model based on the actual outcomes.

Updating the prioritization model can include obtaining priority values for the content provided in response to the holdout requests; comparing the priority values to the actual outcomes; and adjusting the prioritization model based on a difference between the priority values and the actual outcomes.

Methods can include adjusting the prioritization model based on a relationship between the target loss percentage and the percentage of dropped content requests that are denied access to the computing resources.

Methods can include obtaining, by the data processing apparatus and from the model, a priority value for the content request based on the features input to the model, which includes determining, using the prioritization model, a probability that the content request generates a positive outcome based on outcomes for the requests in the set of prior content requests; and determining, using the prioritization model, an expected magnitude of the positive outcome for the content request based on positive outcomes generated by the prior requests for content; and combining, by the data processing apparatus, the probability that the content request generates a positive outcome with the expected magnitude of the positive outcome to generate the priority value.

Determining the specified threshold based on the target loss percentage and outcomes for the set of prior content requests can include obtaining an outcome for each request in the set of prior content requests; aggregating the outcome for each request in the set of prior content requests for content to generate an aggregated outcome for the set of prior content requests; and scaling the aggregated outcome by a target loss percentage to generate the specified threshold.

Methods can include updating the specified threshold based on the target loss percentage and outcomes for the holdout requests.

Updating the specified threshold based on the target loss percentage and outcomes for the holdout requests can include obtaining an outcome for each request in the holdout requests; aggregating the outcome for each request in the holdout requests to generate an aggregated outcome for the holdout requests; and scaling the aggregated outcome by a target loss percentage to generate the specified threshold.

As noted above, processing and responding to requests can require a significant amount of computing resources, while not guaranteeing any specific outcome. For example, some of these requests result in a positive outcome for the content provider, while others do not. A positive outcome can be any response to a request that results in a favorable outcome for the content provider, such as a user interacting with content that is provided by the content provider. For example, the user may interact with the content by selecting the content with an input device, downloading the content, hovering over the content with a cursor, or viewing the content on an output device. Conversely, some content requests may not result in a user interacting with content that is provided by the content provider. Thus, there are some content requests that do not result in a positive outcome for the content provider but require expending a significant amount of computing resources. In either case, processing and responding to the requests consumes limited computing resources that are then not available for processing other requests, or being allocated to other tasks (e.g., enabling a process completely independent of the request processing). This document discusses various techniques and systems that can improve the request processing efficiency, for example, by limiting allocation of computing resources to those requests that are identified as likely to lead to a positive outcome, thereby freeing up computing resources that would have been allocated to handle all requests for allocation to other tasks.

Particular embodiments of the subject matter described in this specification can be implemented to realize one or more of the following advantages. For example, the innovations described in this specification facilitate efficient use of computing resources for responding to content requests. Specifically, the innovations described in this specification achieve operational efficiency by preserving computing resources instead of expending them on content requests that do not result in a positive outcome for the content provider. As a result, these computing resources can be made available to high priority requests, i.e., content requests that result in a positive outcome for the content provider.

As another example, the innovations described in this specification facilitate more accurate prioritization of content requests through more accurate predictive modeling. Conventional models are generally static, i.e., they are not updated with new sets of data. Such models, owing to the stale and static data on which they are based, may incorrectly classify certain high priority requests as low priority requests. The modeling techniques described in this specification achieve higher accuracy in request classification by utilizing a dynamic model that is regularly updated using new sets of content requests referred to as holdout requests. As part of training and updating the model, these holdout requests are provided access to the requisite computing resources irrespective of whether they include features that may result in, for example, them being classified as low priority requests. By providing the requisite computing resources to these holdout requests, their actual outcomes can be determined and then used to update the model based on the differences between the actual outcomes and the priority values generated by the model. The updated model thus generates more accurate priority values for future content requests. In other words, future content requests may be more accurately classified as high or low priority requests.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
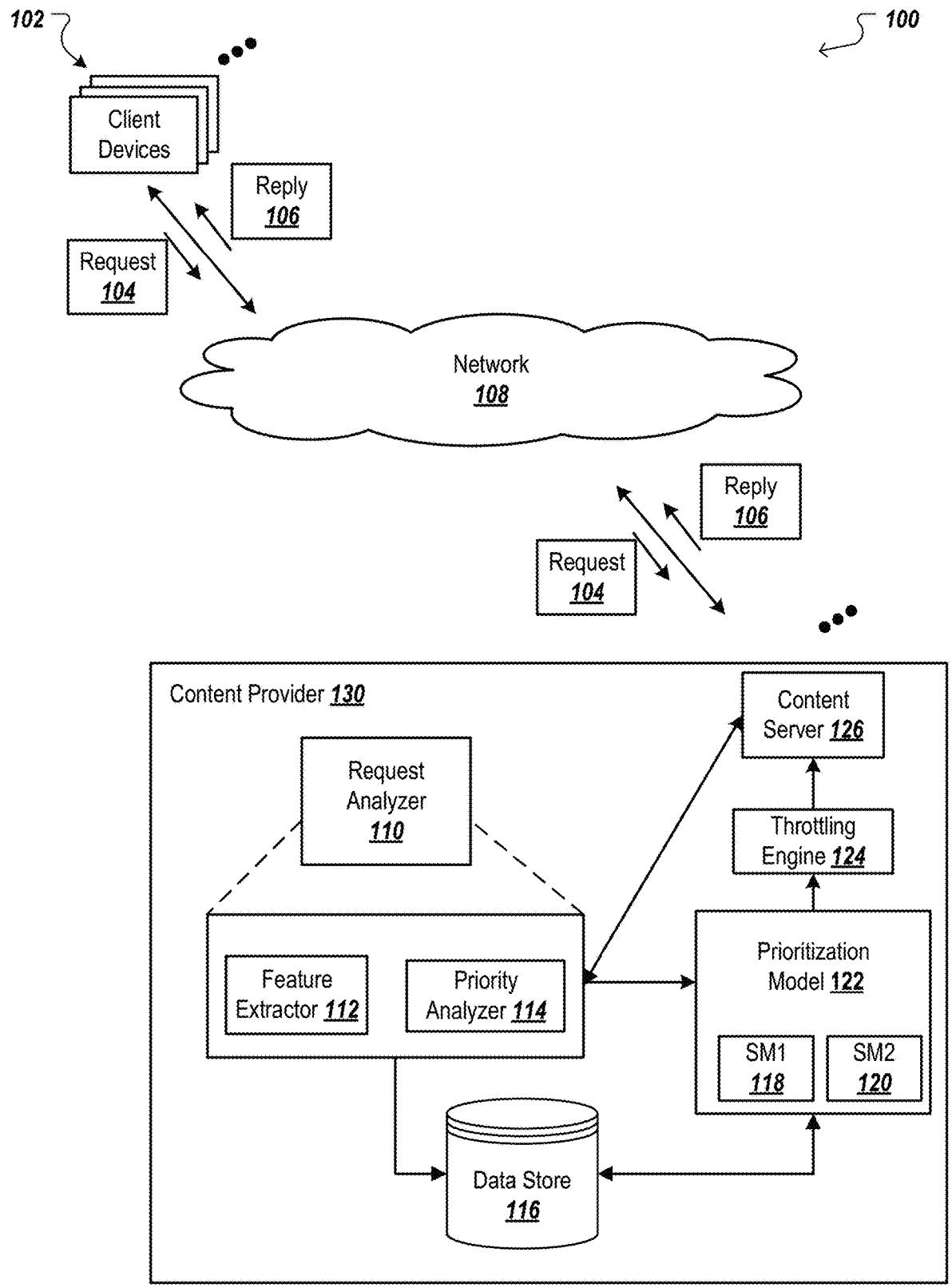
FIG. 1 is a block diagram of an example environment in which content is distributed for presentation.

Content providers regularly receive and respond to numerous content requests. Processing and responding to these requests may require a significant amount of computing resources. In some scenarios, content providers receive content requests that require a significant amount of computing resources, but do not result in a positive outcome for the content provider. Such requests, which will be referred to in this specification as low priority requests, consume computing resources that may be otherwise available to high priority requests, i.e., requests that result in positive outcomes for the content provider. A positive outcome can be any response to a request that results in a favorable outcome for the content provider, such as a user interacting with content that is provided by the content provider.

As described in this specification, computing resources can be used efficiently by throttling access to computing resources required to respond to low priority requests, while providing access to computing resources required to respond to high priority requests. In determining whether to throttle access to computing resources needed to respond to a content request, the content provider first determines whether the content request is a low priority request. To facilitate this determination, the content provider extracts features from the content request and inputs these features into a prioritization model.

The prioritization model, which is trained using data for a set of prior requests for content, determines a priority value for a received content request based on the features of the content request that are input to the prioritization model. In turn, the prioritization model outputs the priority value for the content request, which can be used to determine, for example, whether the request is a high priority request or a low priority request, as discussed in more detail below.

The content provider also determines a specified threshold, which represents the maximum allowable negative outcome for the content provider, that controls the throttling of access to the computing resources. The specified threshold can be determined based on the actual outcomes of the set of prior content requests, as scaled by a pre-determined target loss percentage, as detailed throughout this specification.

The content provider compares the priority value for the content request to the specified threshold. If the priority value for a content request does not meet the specified threshold, the request is considered a low priority request. On the other hand, if the priority value for a content request meets the specified threshold, the request is considered a high priority request.

The content provider also determines whether to provide access to (or allocate) the computing resources that are required to respond to the content request. If the content provider has determined that the request is a low priority request, the content provider throttles access to the computing resources required to respond to the request. On the other hand, if the content provider determines that the request is a high priority request, the content provider provides access to the computing resources required to respond to the request.

To ensure that the prioritization model continues to provide accurate predictions for the content requests that it receives over time, the content provider may regularly update the prioritization model using a set of new content requests that are not subject to the throttling discussed above, such that all of the requests in the set of new content requests are processed. Specifically, the content provider may evaluate the actual outcomes and the priority values of this new set of content requests, and use the difference between the actual outcomes and the priority values to update the prioritization model.

These features and additional features are described in more detail below with reference to FIGS. 1-5.

FIG. 1 is a block diagram of an example environment 100 in which content is distributed for presentation. The example environment 100 includes a network 108, such as a local area network (LAN), a wide area network (WAN), the Internet, or a combination thereof. The network 108 connects content providers 130 and client devices 102. The example environment 100 may include many different content providers 130 and client devices 102.

A client device 102 is an electronic device that is capable of requesting and receiving content and resources over the network 108. Example client devices 102 include personal computers, mobile communication devices, digital assistant devices, and other devices that can send and receive data over the network 108. A client device 102 typically includes a user application, such as a web browser, to facilitate the sending and receiving of data over the network 108, but native applications executed by the client device 102 can also facilitate the sending and receiving of content over the network 108.

Examples of content presented at a client device 102 include webpages, word processing documents, portable document format (PDF) documents, images, videos, and search results pages. Content can be provided to client devices 102 by content providers 130. For example, in some implementations, the content provider 130 include content servers 126 that host content that is provided in response to a content request. In this example, the client device 102 can initiate a content request 104. The content request 104 is transmitted, by the client device 102, over the network 108 (e.g., a telecommunications network) to the content provider 130.

In some implementations, the content provider 130 includes a request analyzer 110, a data store 116, a prioritization model 122, a throttling engine 124, and one or more content servers 126. The content provider 130 may be implemented as a data processing apparatus or as a computer system that is described with reference to FIG. 5, or any other appropriate processing system.

As depicted in the block diagram of FIG. 1, the content provider 130 is depicted as a single block with various sub-blocks. However, while the content provider could be a single device or single set of devices, this specification contemplates that the content provider could also be a group of devices, or even multiple different systems that communicate in order to provide content to client devices. For example, the content provider could encompass one or more of a search system, a video streaming service, an audio streaming service, a navigation service, or any other service. The content provider could encompass the publisher of the content or may be an entity different from the publisher.

The above-described components of the content provider 130 determine whether a content request is a low priority request and whether to provide access to the required computing resources to respond to the content request. The operation of these components is described with reference to FIG. 2, which is a flow chart of an example process 200 that is implemented by the content provider to determine whether to provide access to the required computing resource to respond to a content request. The operations of the process 200 are described below for purposes of illustration only. The operations of the process 200 can be performed by any appropriate device or system, e.g., any appropriate data processing apparatus. The operations of the process 200 can also be implemented as instructions that are stored on a computer readable medium, which, when executed by one or more data processing apparatus, cause the one or more data processing apparatus to perform the operations of the process 200.

The content provider 130 receives a content request 104 from a client device (at 202). For example, the content request 104 may be a query containing the words "cheap tax preparation companies" that is sent by a user through the browser of its mobile device and received by the content provider 130. For example, the content provider 130 may be a search engine or any other type of service (e.g., a web server) that is configured to respond to a content request 104 by transmitting content to a client device 102.

The content provider 130 extracts features from the content request 104 (at 204). Upon receiving the content request 104, this request is sent to the request analyzer 110 component of the content provider 130. In some implementations, the request analyzer 110 includes two subcomponents: feature extractor 112 and priority analyzer 114. The feature extractor 112 extracts one or more features from the content request 104. The term "feature" as used herein may refer to any property of a content request 104 that can be used by the content provider 130 to select the appropriate content to provide in response to the request. For example, the feature extractor 112 may extract features from the content request 104, which include, among other features, keywords referenced with the request, entities referenced with the request (e.g., peoples, places, things), geographic information (e.g., region where request was submitted, network location), a name (or network location) of the requesting device (e.g., the client device 102), whether the user is using an ad blocker, the type of device that the user is using (browser on a desktop, browser on a mobile device), type of browser (e.g., Chrome, Safari, Firefox), time of the request, and day of the request. As used herein, extracting features includes retrieving features from the content request as well as identifying the features within the content request.

In the above example, the content provider extracts features from the query containing the words "cheap tax preparation companies" that is sent by a user through its mobile device's browser. The extracted features in this example may include the words present in the query ("cheap tax preparation companies"), the IP address of the client device 104, which may be used to determine that the query originated from San Mateo, Calif., and that the user is using a Brand X browser on its mobile device.

The content provider then inputs some or all of the extracted features to a prioritization model (at 206). The prioritization model is configured to generate a numerical value, which is referred to as a priority value. The priority value can be used to prioritize content requests, so as to determine whether an individual content request is allowed access to computing resources to respond to the request. The feature extractor 112, upon extracting the features from the content request 104, inputs those features into the prioritization model 122. In the above example, the words "cheap tax preparation companies," San Mateo, Calif., mobile device, and Brand X browser are input as features to the prioritization model.

Based on the features that the feature extractor 112 inputs to the prioritization model 122, the prioritization model 122 outputs a priority value for the content request 104 (at 208). In some implementations, the prioritization model 122 may be generated using data from a set of prior content requests. Specifically, the prioritization model 122 may use the extracted features from prior content requests and actual outcomes of prior content requests to determine the priority value for a content request.

The prioritization model 122 may include two sub-models: SM1 118 and SM2 120. SM1 118 determines the probability that the request generates a positive outcome and SM2 120 determines a conditional expected outcome for content requests with a positive outcome. The outputs of SM1 118 and SM2 120 may be combined to generate the priority value.

The first sub-model, SM1 118, of the prioritization model 122 predicts the probability that the content request generates a positive outcome based on the outcomes generated by a set of prior content requests (at 214). The feature extractor 112 extracts features from the prior content requests and the priority analyzer 114 obtains the outcomes for each of these requests. These extracted features and the outcomes for the prior content requests are stored in the data store 116. SM1 118 accesses the data specifying these features and outcomes for the prior content requests from the data store 116. In some implementations, the first sub-model uses a Poisson Regression model where, for a content request CR with feature levels X, the model predicts CR's probability of generating a positive outcome according to the following assumptions:

$$N_X|O_X \sim \text{Poisson}(O_X \lambda_X),$$

$$\log(\lambda_X) = \Theta^T X,$$

where $O_X$ is the number of times a content request with feature levels X has been seen (offset), $N_X$ is the number of those with an expected positive outcome, and $\Theta$ represents the parameter vector of the model.

For example, SM1 118 may determine the probability that a query generates a positive outcome (e.g., a user interacts with content provided in response to the query) based on the all outcome data (including queries with both positive outcomes and negative outcomes) for prior queries. Therefore, the probability that the content request CR results in a positive outcome, which in the above example is whether the query leads to the provision of content with which a user can interact, is estimated as follows:

$$P(\text{Interaction} > 0) = 1 - P(N_X = 0) = 1 - e^{-\lambda_X} = 1 - e^{-\Theta^T X}.$$

The second sub-model SM2 120 of the prioritization model 122 predicts the conditional expected outcome of the content request based on the requests in the set of prior content requests that generated a positive outcome (at 216). The conditional expected outcome is a numerical value that represents the magnitude of the positive outcome of the content request. SM2 120 uses the data specifying the features and outcomes for the prior content requests that are stored in the data store 116. This model may be implemented using a Log-Gaussian regression model. In some implementations, for each content request CR with feature levels X, the Log-Gaussian model predicts CR's expected outcome (which may quantify a user's interaction with content provided in response to the query) according to the following assumptions:

$$\log(\text{Rev} + \varepsilon) \sim \text{Gaussian}(\Gamma^T X, \sigma^2),$$

where $\Gamma$ is the parameter vector of the model and $\varepsilon$ is set to a small positive number ($\varepsilon \sim 10^{-6}$) to prevent very small log arguments.

The prioritization model 122 combines the outputs of SM1 118 and SM2 120 to generate the priority value. Specifically, the prioritization model 122 determines the priority value by combining the probability of a positive outcome, determined by SM1 118, with the conditional expected outcome, determined by SM2 120 (at 218). This may be represented using the following equation:

$$E[\text{Interaction}] = P(\text{Interaction} > 0) \times E[\text{Interaction} | \text{Interaction} > 0]$$

In the above example where the user submits a query containing the words "cheap tax preparation companies" through a mobile device browser, the prioritization model may determine, based on the input features of the content request, that the content request has a priority value of 65. For ease of explanation, priority values are shown as integers in this specification, but it will be appreciated priority values can be measured on any suitable scale (e.g., currency, time, etc.).

Note that while specific implementations of models are discussed above for purposes of example, other appropriate models can be used, such as, for example, linear regression models and neural network models.

The content provider 130 determines a specified threshold based on a target loss percentage and outcomes for the set of prior requests (at 210). The details of the process by which the content provider determines a specified threshold is described with reference to FIG. 4, which is a flow chart of an example process 400 that is implemented by the content provider 130 to determine the specified threshold.

Figure 4:
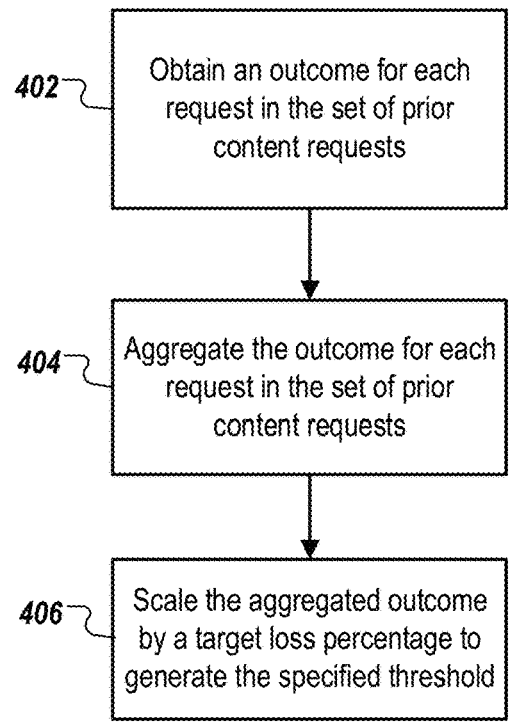
FIG. 4 is a flow chart of an example process to determine a specified threshold.

As described with reference to FIG. 4, the content provider obtains the outcome for each request in the set of prior content requests (at 402). As an example, the content provider may access the actual outcomes (e.g., revenues, such as advertising revenues, user actions taken, or other outcomes) for the set of prior content requests stored in the data store 116. For example, assume for purposes of example, there are ten prior content requests the following advertising revenues (in US Dollars): 100, 150, 200, 50, 30, 10, 25, 400, 15, 20. It will be appreciated that revenue is just one possible way in which the actual outcome of the prior content requests can be quantified. Other ways in which outcomes of prior content requests can be quantified include user viewing times or interaction times of content.

The content provider 130 aggregates the outcomes for the prior content requests to generate an aggregated outcome (at 404). In the above example, the content provider 130 determines that the total revenue for the prior content requests is $1000 based on the aggregation (e.g., 100+150+200+50+30+10+25+400+15+20). If the actual outcomes are quantified using user viewing times, the content provider 130 determines the total viewing time for the prior content requests by aggregating (summing up) the viewing times for each request.

The content provider scales the aggregated outcome by a target loss percentage to generate the specified threshold (at 406). The target loss percentage, which may be predetermined, specifies the proportion of content requests that are denied access to computing resources. The content provider 130 can thus adjust the performance of the system by specifying a target loss percentage that results in service being denied to a proportion of the content requests. In the above example, the content provider 130 may set the target loss percentage at 10%. The content providers thus scales the total revenue of $1000 by this 10% target loss percentage, to generate a specified threshold of 100. If the actual outcomes are quantified using user viewing times, the content provider 130 scales the total viewing time for the prior content requests by the target loss percentage of 10%.

The computation of the specified threshold may also be performed in other ways. In some implementations, the content provider may obtain the predicted and actual outcomes for the prior content requests. The content provider aggregates the actual outcomes for the prior content requests. Using the above example, the actual aggregated outcome is 1000 for 10 prior content requests. Then, the content provider computes an initial threshold by scaling the total actual outcome by a predetermined target loss threshold of 10%. In the above example, the content provider scales the actual aggregated outcome of 1000 by a predetermined target loss threshold of 5%, to obtain an initial threshold of 50 (i.e., 5/100*1000).

The content provider sorts the predicted outcomes in an increasing order and then, uses this order to obtain the corresponding set of actual outcomes. Then, beginning with the first content request in the list of actual outcomes, the content provider adds the actual outcome of each request until the sum of the actual outcomes of the analyzed requests exceeds the initial threshold. At that point, the content provider selects as the specified threshold, the predicted outcome corresponding to the last actual outcome for which the sum of the predicted outcomes did not exceed the initial threshold.

In the above example, the content provider obtains the actual revenues [100, 150, 200, 50, 30, 10, 25, 400, 15, 20] and the corresponding predicted revenues [100, 150, 200, 50, 30, 10, 20, 400, 15, 22] for each of the 10 prior content requests. The content provider sorts the predicted revenues in increasing order to obtain the following data set: 10, 15, 20, 22, 30, 50, 100, 150, 200, 400. The content provider then, uses this order, to obtain a data set of the actual revenues corresponding to the actual data set, which is as follows: 10, 15, 25, 20, 30, 50, 100, 150, 200, 400. Then, beginning with the first outcome in the actual revenue data set, the content provider adds the actual revenues of each request until the sum of the actual revenues exceeds the initial threshold of 50. The sum of the actual revenues after the first three requests (i.e., 10+15+25) is 50. The sum of the actual revenues exceeds the initial threshold of 50 (i.e., 10+15+25+20=70, which is greater than 50) when the fourth actual revenue of 20 is added to the sum of the actual revenues. Accordingly, the content provider selects 20 as the specified threshold because it is the predicted revenue corresponding to the last actual revenue (25) for which the sum of the actual revenues did not exceed the initial threshold of 50. The above analysis would be identical if the outcomes of the content requests can be quantified using user viewing times or interaction times of content (or in any other appropriate way), instead of revenues.

The specified threshold may be regularly updated using the above described processes based on a new set of content requests (which is referred to in this specification as holdout requests) and their corresponding outcomes.

Note that percentages are used for purposes of example above, but the target loss can be expressed in other ways, such as a total aggregate loss, a total loss over a specified period, or some other measure of loss. Note also that the threshold may be vary based on the content provided, the content provider, and/or the country in which the content is provided.

Figure 2:
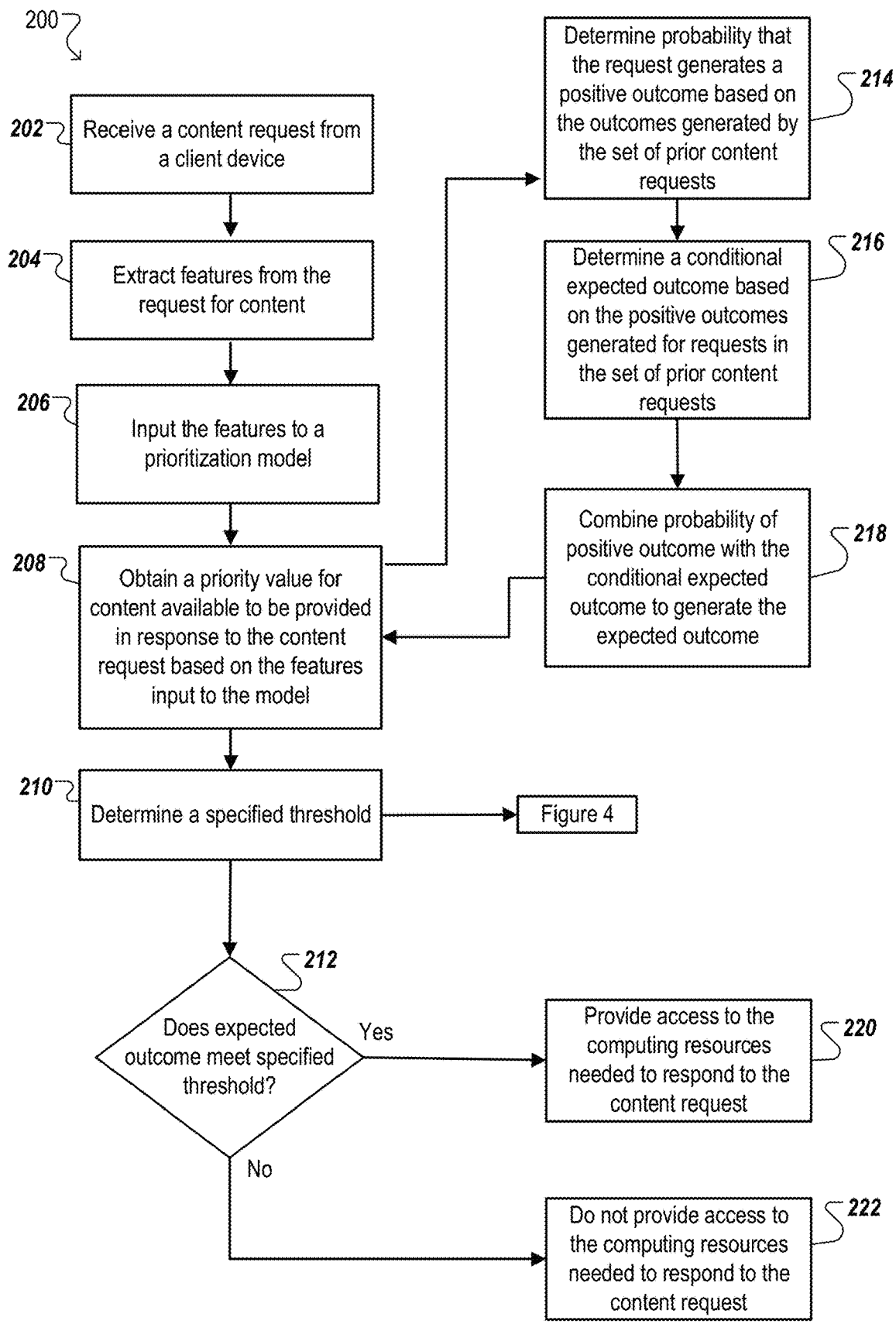
FIG. 2 is a flow chart of an example process to determine whether to provide access to the required computing resources to respond to a content request.

With reference to FIGS. 1 and 2, the content provider 130 determines whether the priority value meets the specified threshold (at 212). The content provider 130 inputs the priority value generated by the prioritization model 122 and the specified threshold to the throttling engine 124. Based on the priority value and the specified threshold, the throttling engine 124 evaluates whether to provide access to the computing resources required to respond to the content request 104. In the above example, the throttling engine 124 compares the priority value of 65 (generated by the prioritization model 122) with the specified threshold of 100.

If the throttling engine 124 determines that the priority value does not meet the specified threshold, the throttling engine denies access to the computing resources required to respond to the request (at 222). In the above example, because the priority value of 65 does not meet the specified threshold of 100, the throttling engine denies access to the computing resources required to identify the ad listings for the content request.

Upon determining that the priority value does not meet the specified threshold, the throttling engine 124 may inform the content server 126 to not process the content request 104. In some implementations, the throttling engine 124 may send a message to the content server 126 that includes the content request 104, the extracted features, and a "No" indicator regarding whether to provide access to computing resources to respond to the content request. Upon receiving this message, the content server 126 ignores the content request 104 and may respond to the client device 102 with "Access Denied" in the reply 106. As a result, the client device 102 may simply not display any content. Other ways of informing the content server to not process the content request include setting a data flag that prevents the content server from processing the content request or simply not instructing the content server to process the content request (e.g., in situations where the content server's default is to not process content requests unless expressly instructed to do so).

On the other hand, if the throttling engine 124 determines that the priority value meets the specified threshold, the throttling engine 124 provides access to the computing resources required to respond to the request (at 220). In the above example, if the priority value had met or exceeded the specified threshold of 100, the throttling engine would provide access to the computing resources required to provide content in response to the content request.

In some implementations, upon determining that the priority value meets the specified threshold, the throttling engine 124 may inform the content server 126 to process the content request 104. The throttling engine 124 may send a message to the content server 126 that includes the content request 104, the extracted features, and a "Yes" indicator regarding whether to provide access to computing resources to respond to this request. Upon receiving this message, the content server 126 utilizes computing resources to identify the appropriate content (e.g., search results) to respond to the content request 104. The content server 126 then provides this content to the client device 102 in the reply 106. As a result, in the case of search results in a search engine, the client device 102 displays the retrieved search results. Other ways of informing the content server to process the content request include setting a data flag that triggers the content server to process the content request or simply not sending any instructions to the content server (e.g., in situations where the content server's default is to process content requests unless expressly instructed to do so).

As described above with reference to FIGS. 1 and 2, the prioritization model is trained using a set of prior content requests and generates a priority value for a particular content request based on the set of prior content requests. In some implementations, the prioritization model is updated on regular intervals using a new set of content requests, as described with reference to FIG. 3.

Figure 3:
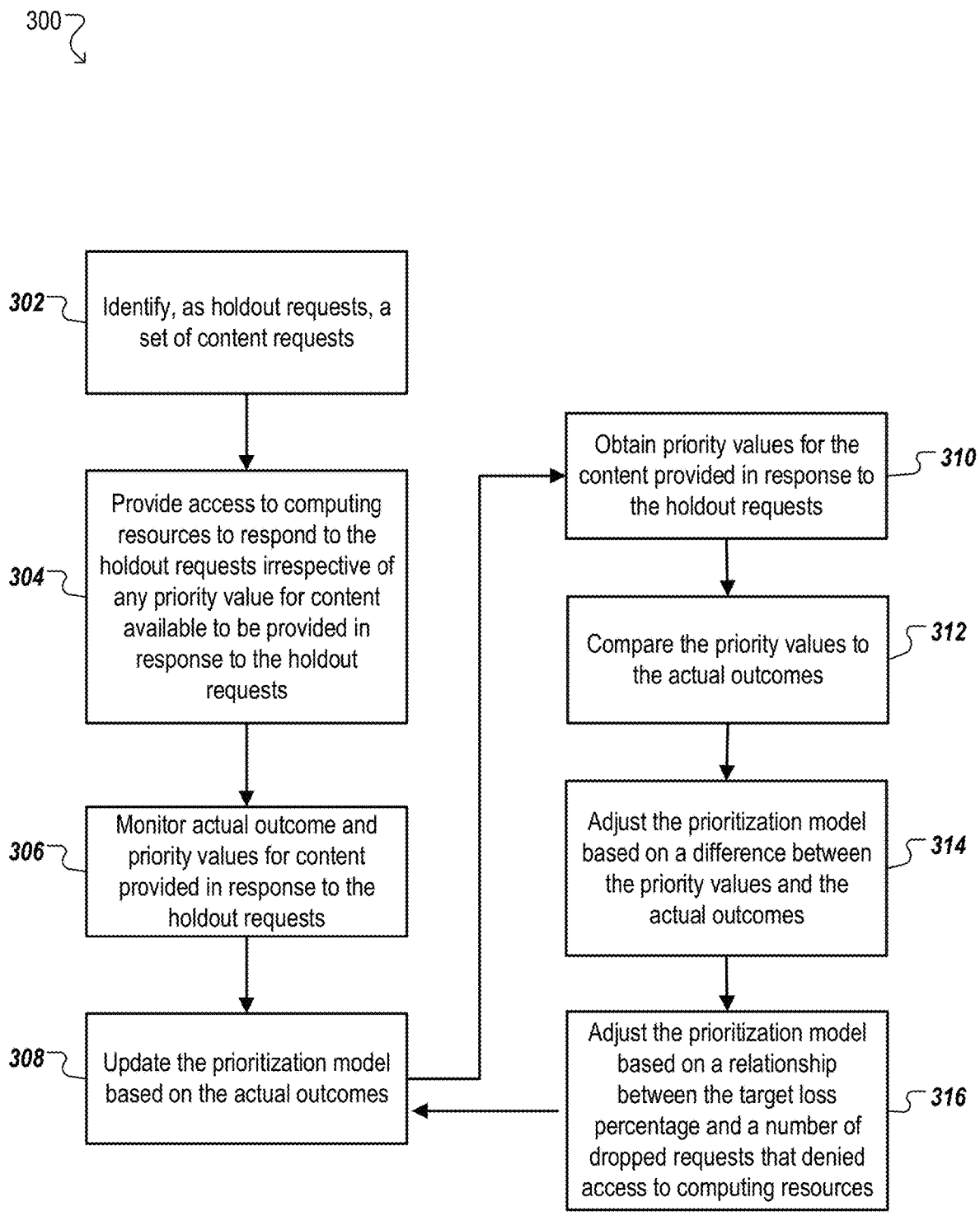
FIG. 3 is a flow diagram of an example process to update the prioritization model.

FIG. 3 is a flow diagram of an example process 300 that is implemented by the content provider 130 to update the prioritization model 122.

After receiving the particular content request from the client device 102 (the processing of which is described with reference to FIG. 2) or at any time, the content provider 130 may identify, as holdout requests, a new set of content requests received from a plurality of client devices (at 302).

For these holdout requests, the content provider 130 provides access to the required computing resources irrespective of any priority value for the holdout requests (at 304). In some implementations, after the feature extractor 112 component extracts features from the holdout requests, the feature extractor sends the extracted features and the corresponding holdout requests in parallel to the content server 126, the prioritization model 122, and the data store 116.

For the holdout requests that are sent to the prioritization model 122, the prioritization model determines the priority value (as described above with reference to FIGS. 1 and 2) and stores these priority values in the data store 116.

For the holdout requests that the feature extractor 112 sends directly to the content server 126, the content server 126 expends computing resources to identify content for the extracted features of the holdout requests. In the case of holdout requests, the content server 126 does not require any message from the throttling engine 124 regarding whether to process or not process the content request. For example, when the feature extractor 112 sends the extracted features directly to the content server, it may also include a tag identifier of "Holdout," which may allow the content server 126 to operate without receiving any instructions from the throttling engine 124.

The content provider 130 monitors the actual outcomes for the content provided in response to the holdout requests (at 306). In some implementations, the priority analyzer 114 monitors the actual outcomes of each of the holdout requests processed by the content server 126. For example, when holdout requests are being processed, the priority analyzer 114 may have an agent running at the content server 126 through which the content provided by the content server 126 passes before being sent to the client device 102. The priority analyzer 114 extracts the content source (e.g., a server that may host content that is provided in response to the content request) and session identifier (i.e., an identifier for the specific content request 102 for which content was provided) from the meta data included with the content. The agent of the priority analyzer 114 may then query the content source to obtain the actual outcome data corresponding to the particular session identifier. Upon receiving the actual outcome data from the content source, the priority analyzer 114 stores this data for each of the holdout requests in the data store 116.

The content provider 130 updates the prioritization model based on the actual outcomes (at 308). This may be accomplished in three steps. First, the content provider 130 obtains priority values for the content provided in response to the holdout requests (at 310). In some implementations, the priority analyzer 114 obtains the priority values for the holdout requests that are stored in the data store 116. For example, the priority analyzer 114 may query the data store 116 for the priority values of the holdout requests. The priority analyzer may send unique identifiers for each of the holdout requests to the data store 116, which may store the identifier for different content requests and the corresponding data for each of these requests. Accordingly, upon receiving the query from the priority analyzer 114, the data store 116 uses the identifiers to locate the corresponding priority value data stored in the data store 116.

The content provider 130 compares the priority values to the actual outcomes (at 312) and adjusts the prioritization model based on a difference between the priority values and the actual outcomes (at 314). In some implementations, the priority analyzer 114 obtains from the data store 116, the actual outcomes for each of the holdout requests. The priority analyzer 114 then compares the priority values and the actual outcomes for the holdout requests. For example, the priority analyzer 114 determines the difference between the actual outcomes and the priority values for each of the holdout requests. The actual outcomes and/or the priority values may be scaled (e.g. multiplied by a numerical value) to enable their comparison. In some implementations, the priority analyzer 114 may generate an average difference based on the differences between the priority values and the actual outcomes, and then use this average difference to update the prioritization model. For example, the priority analyzer 114 may determine that the average difference between the priority value and the actual outcome is −50. In other words, the priority analyzer 114 may determine that the actual outcome was, on average, 50 less than the priority value. One way that the content provider 130 can update the prioritization model 122 is by scaling the output by 50. For example, the content provider 130 may subtract 50 from the final determined output of the current prioritization model. Thus, if the current model would have generated a priority value of 100, the updated model would generate a priority value of 50 (i.e., 100 minus 50).

The content provider 130 may further adjust the prioritization model based on a relationship between the target loss percentage and a number of dropped requests that are denied access to the computing resources (316). For example, based on the content requests that have been received by the content provider 130 over time, the content provider 130 may maintain a distribution of the number of dropped requests that are denied access to the computing resources at particular target loss percentages.

For example, while a current request drop rate may be at 50%, the content provider 130 may determine, based on the distribution, that the desired number of dropped requests should instead be at 70% for a target loss percentage of 10%. The content provider 130 may achieve this optimal request drop rate by adjusting the prioritization model. This is illustrated using a specified threshold of 37.5 based on a 10% target loss percent and a sample data of 10 content requests with the following priority values determined by the prioritization model: 15, 20, 25, 30, 35, 40, 45, 50, 55, and 60. Using the specified threshold of 37.5, the first five request whose priority values are below 37.5 are dropped.

In this example, the 10% target loss percentage only results in a 50% request drop rate (i.e., 5 dropped queries out of a total 10 queries). Increasing the request drop rate from 50% to 70% at the same target loss threshold may be accomplished by scaling the output of the prioritization model by 10. As a result, the sample data of 10 content requests would now have the following updated priority values: 5, 10, 15, 20, 25, 30, 35, 40, 45, and 50. Now, applying the specified threshold of 37.5, a 70% request drop rate is achieved. This is because the first seven requests whose priority values are below 37.5 are dropped.

Figure 5:
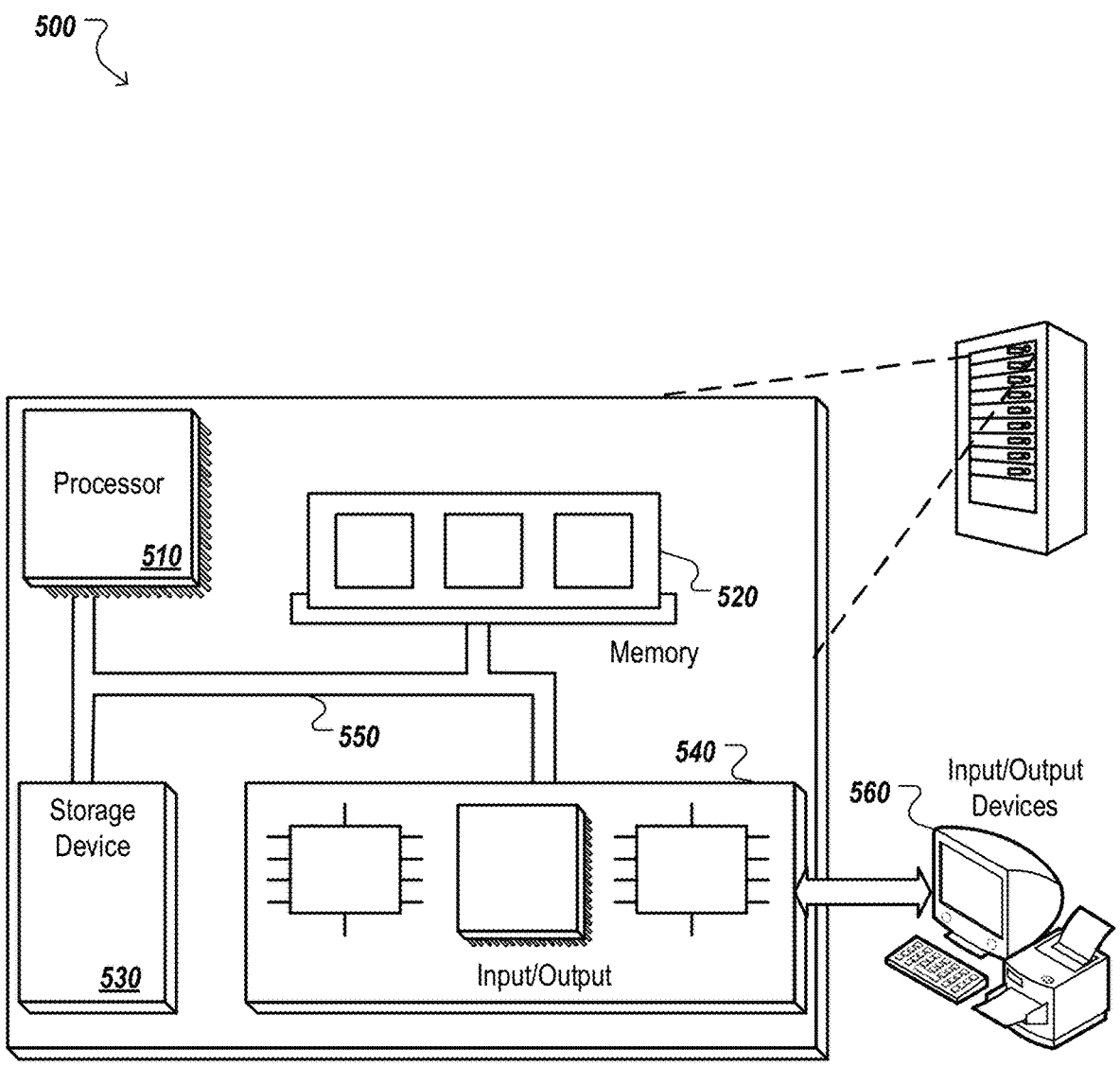
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   receiving, by a data processing apparatus and from a client device, a content request;
   extracting, by the data processing apparatus, features from the content request;
   inputting, by the data processing apparatus, the features to a prioritization model that is trained using a set of prior content requests;
   obtaining, by the data processing apparatus and from the prioritization model, a priority value for the content request based on the features input to the model;
   determining a specified threshold based on a target loss percentage and outcomes for the set of prior content requests; and
   throttling, by the data processing apparatus, access to computing resources used to respond to the request based on the specified threshold and the priority value for the content request, including:
      providing access to the computing resources to respond to the request when the prioritization model outputs a priority value that meets the specified threshold; and
      denying access to the computing resources when the prioritization model outputs a priority model that fails to meet the specified threshold.

2. The computer implemented method of claim 1, further comprising:
   identifying, as holdout requests, a set of subsequent content requests received following receipt of the content request;
   providing access to the computing resources required to respond to the holdout requests irrespective of any priority value for the holdout requests;
   monitoring actual outcomes for content provided in response to the holdout requests; and
   updating the prioritization model based on the actual outcomes.

3. The computer implemented method of claim 2, wherein updating the prioritization model, comprises:

obtaining priority values for the content provided in response to the holdout requests;
comparing the priority values to the actual outcomes; and
adjusting the prioritization model based on a difference between the priority values and the actual outcomes.

4. The computer implemented method of claim 3, further comprising adjusting the prioritization model based on a relationship between the target loss percentage and the percentage of dropped content requests that are denied access to the computing resources.

5. The computer implemented method of claim 4, wherein obtaining, by the data processing apparatus and from the model, a priority value for the content request based on the features input to the model comprises:
determining, using the prioritization model, a probability that the content request generates a positive outcome based on outcomes for the requests in the set of prior content requests; and
determining, using the prioritization model, an expected magnitude of the positive outcome for the content request based on positive outcomes generated by the prior content requests; and
combining, by the data processing apparatus, the probability that the content request generates a positive outcome with the expected magnitude of the positive outcome to generate the priority value.

6. The computer implemented method of claim 1, wherein determining the specified threshold based on the target loss percentage and outcomes for the set of prior content requests comprises:
obtaining an outcome for each request in the set of prior content requests;
aggregating the outcome for each request in the set of prior content requests to generate an aggregated outcome for the set of prior content requests; and
scaling the aggregated outcome by a target loss percentage to generate the specified threshold.

7. The computer implemented method of claim 2, further comprising updating the specified threshold based on the target loss percentage and outcomes for the holdout requests.

8. The computer implemented method of claim 7, wherein updating the specified threshold based on the target loss percentage and outcomes for the holdout requests comprises:
obtaining an outcome for each request in the holdout requests;
aggregating the outcome for each request in the holdout requests to generate an aggregated outcome for the holdout requests; and
scaling the aggregated outcome by a target loss percentage to generate the specified threshold.

9. A system, comprising:
one or more memory devices storing instructions; and
one or more data processing apparatus that are configured to interact with the one or more memory devices, and upon execution of the instructions, perform operations including:
receiving, from a client device, a content request;
extracting features from the content request;
inputting the features to a prioritization model that is trained using a set of prior content requests;
obtaining, from the prioritization model, a priority value for the content request based on the features input to the model;
determining a specified threshold based on a target loss percentage and outcomes for the set of prior content requests; and
throttling access to computing resources used to respond to the request based on the specified threshold and the priority value for the content request, including:
providing access to the computing resources to respond to the request when the prioritization model outputs a priority value that meets the specified threshold; and
denying access to the computing resources when the prioritization model outputs a priority value that fails to meet the specified threshold.

10. The system of claim 9, wherein the one or more data processing apparatus are configured to perform operations further comprising:
identifying, as holdout requests, a set of subsequent content requests received following receipt of the content request;
providing access to the computing resources required to respond to the holdout requests irrespective of any priority value for the holdout requests;
monitoring actual outcomes for content provided in response to the holdout requests; and
updating the prioritization model based on the actual outcomes.

11. The system of claim 10, wherein updating the prioritization model, comprises:
obtaining priority values for the content provided in response to the holdout requests;
comparing the priority values to the actual outcomes; and
adjusting the prioritization model based on a difference between the priority values and the actual outcomes.

12. The system of claim 11, wherein the one or more data processing apparatus are configured to perform operations further comprising:
adjusting the prioritization model based on a relationship between the target loss percentage and the percentage of dropped content requests that are denied access to the computing resources.

13. The system of claim 12, wherein obtaining, from the model, a priority value for the content request based on the features input to the model comprises:
determining, using the prioritization model, a probability that the content request generates a positive outcome based on outcomes for the requests in the set of prior content requests; and
determining, using the prioritization model, an expected magnitude of the positive outcome for the content request based on positive outcomes generated by the prior content requests; and
combining, by the data processing apparatus, the probability that the content request generates a positive outcome with the expected magnitude of the positive outcome to generate the priority value.

14. The system of claim 9, wherein determining the specified threshold based on the target loss percentage and outcomes for the set of prior content requests comprises:
obtaining an outcome for each request in the set of prior content requests;
aggregating the outcome for each request in the set of prior content requests to generate an aggregated outcome for the set of prior content requests; and
scaling the aggregated outcome by a target loss percentage to generate the specified threshold.

15. The system of claim 10, wherein the one or more data processing apparatus are configured to perform operations further comprising:
updating the specified threshold based on the target loss percentage and outcomes for the holdout requests.

16. The system of claim 15, wherein updating the specified threshold based on the target loss percentage and outcomes for the holdout requests comprises:
  obtaining an outcome for each request in the holdout requests;
  aggregating the outcome for each request in the holdout requests to generate an aggregated outcome for the holdout requests; and
  scaling the aggregated outcome by a target loss percentage to generate the specified threshold.

17. A non-transitory computer readable medium storing instructions that, when executed by one or more data processing apparatus, cause the one or more data processing apparatus to perform operations comprising:
  receiving, from a client device, a content request;
  extracting features from the content request;
  inputting the features to a prioritization model that is trained using a set of prior content requests;
  obtaining, from the prioritization model, a priority value for the content request based on the features input to the model;
  determining a specified threshold based on a target loss percentage and outcomes for the set of prior content requests; and
  throttling access to computing resources used to respond to the request based on the specified threshold and the priority value for the content request, including:
    providing access to the computing resources to respond to the request when the prioritization model outputs a priority value that meets the specified threshold; and
    denying access to the computing resources when the prioritization model outputs a priority value that fails to meet the specified threshold.

18. The non-transitory computer readable medium of claim 17, wherein the instructions, when executed by one or more data processing apparatus, cause the one or more data processing apparatus to perform operations comprising:
  identifying, as holdout requests, a set of subsequent content requests received following receipt of the content request;
  providing access to the computing resources required to respond to the holdout requests irrespective of any priority value for the holdout requests;
  monitoring actual outcomes for content provided in response to the holdout requests; and
  updating the prioritization model based on the actual outcomes.

19. The non-transitory computer readable medium of claim 18, wherein updating the prioritization model, comprises:
  obtaining priority values for the content provided in response to the holdout requests;
  comparing the priority values to the actual outcomes; and
  adjusting the prioritization model based on a difference between the priority values and the actual outcomes.

20. The non-transitory computer readable medium of claim 19, wherein the instructions, when executed by one or more data processing apparatus, cause the one or more data processing apparatus to perform operations comprising:
  adjusting the prioritization model based on a relationship between the target loss percentage and the percentage of dropped content requests that are denied access to the computing resources.

21. The non-transitory computer readable medium of claim 20, wherein obtaining, from the model, a priority value for the content request based on the features input to the model comprises:
  determining, using the prioritization model, a probability that the content request generates a positive outcome based on outcomes for the requests in the set of prior content requests; and
  determining, using the prioritization model, an expected magnitude of the positive outcome for the content request based on positive outcomes generated by the prior content requests; and
  combining the probability that the content request generates a positive outcome with the expected magnitude of the positive outcome to generate the priority value.

22. The non-transitory computer readable medium of claim 17, wherein determining the specified threshold based on the target loss percentage and outcomes for the set of prior content requests comprises:
  obtaining an outcome for each request in the set of prior content requests;
  aggregating the outcome for each request in the set of prior content requests to generate an aggregated outcome for the set of prior content requests; and
  scaling the aggregated outcome by a target loss percentage to generate the specified threshold.

23. The non-transitory computer readable medium of claim 18, wherein the instructions, when executed by one or more data processing apparatus, cause the one or more data processing apparatus to perform operations comprising updating the specified threshold based on the target loss percentage and outcomes for the holdout requests.

24. The non-transitory computer readable medium of claim 23, wherein updating the specified threshold based on the target loss percentage and outcomes for the holdout requests comprises:
  obtaining an outcome for each request in the holdout requests;
  aggregating the outcome for each request in the holdout requests to generate an aggregated outcome for the holdout requests; and
  scaling the aggregated outcome by a target loss percentage to generate the specified threshold.

* * * * *